US008845203B2

(12) United States Patent
Meeker et al.

(10) Patent No.: US 8,845,203 B2
(45) Date of Patent: Sep. 30, 2014

(54) WHEEL BEARING ASSEMBLY

(75) Inventors: Steven E. Meeker, Norwalk, OH (US); David N. Johnson, Bay Village, OH (US); Connie J. Buynacek, Sandusky, OH (US); Martin P. Grover, Oak Harbor, OH (US)

(73) Assignee: Kyklos Bearing International, Inc., Sandusky, OH (US)

( * ) Notice: Subject to any disclaimer, the term of this patent is extended or adjusted under 35 U.S.C. 154(b) by 1055 days.

(21) Appl. No.: 12/291,144

(22) Filed: Nov. 6, 2008

(65) Prior Publication Data
US 2009/0220183 A1 Sep. 3, 2009

(51) Int. Cl.
*F16C 13/00* (2006.01)
*B60B 27/00* (2006.01)
*F16C 33/58* (2006.01)
*F16C 39/02* (2006.01)
*F16C 19/52* (2006.01)
*F16C 19/50* (2006.01)
*F16C 19/18* (2006.01)

(52) U.S. Cl.
CPC ........... *F16C 19/505* (2013.01); *B60B 27/0084* (2013.01); *F16C 33/586* (2013.01); *F16C 39/02* (2013.01); *B60B 27/0005* (2013.01); *F16C 19/52* (2013.01); *B60B 27/001* (2013.01); *F16C 19/186* (2013.01)
USPC ........................................................ 384/544

(58) Field of Classification Search
USPC .......................... 384/543, 544, 545, 586, 589
See application file for complete search history.

(56) References Cited

U.S. PATENT DOCUMENTS

| 882,846 | A | * | 3/1908 | Sachs | 384/544 |
| 1,303,235 | A | * | 5/1919 | Benson | 384/544 |
| 1,324,911 | A | * | 12/1919 | Lamb | 384/544 |
| 3,583,511 | A | | 6/1971 | Asberg | |
| 4,269,460 | A | | 5/1981 | Orain | |
| 6,036,371 | A | * | 3/2000 | Onose | 384/494 |
| 6,287,015 | B1 | * | 9/2001 | Komaba et al. | 384/589 |
| 6,485,187 | B1 | | 11/2002 | Meeker et al. | |

(Continued)

FOREIGN PATENT DOCUMENTS

| DE | 2707352 A1 | 8/1978 |
| EP | 1950435 A1 | 7/2008 |

(Continued)

OTHER PUBLICATIONS

Translation of JP2007-271055 obtained Apr. 9, 2013.*

(Continued)

*Primary Examiner* — James Pilkington
(74) *Attorney, Agent, or Firm* — Hinshaw & Culbertson LLP (57) ABSTRACT

A bearing assembly having improved impact Brinell resistance is provided. Due to a controlled gap between a rotating component and a non-rotating component or a vehicle suspension structure, the non-rotating component or the vehicle suspension structure is permitted to share impact loads caused by a sufficient side impact to the rotating component, thus preventing excessive loads from being transmitted to rolling elements, and providing greater resistance against Brinell impact damage that would generate a noise and/or vibration condition in the bearing assembly. The width of the controlled gap and of the area of potential contact between the rotating component and the vehicle suspension structure or the non-rotating component are optimized to increase impact Brinell resistance while avoiding excessive contact between the rotating component and the non-rotating component or the vehicle suspension structure during extreme cornering maneuvers.

11 Claims, 9 Drawing Sheets (56) References Cited

U.S. PATENT DOCUMENTS

| | | | |
|---|---|---|---|
| 6,880,898 B2 * | 4/2005 | Nakamura et al. | 384/544 |
| 6,902,325 B1 | 6/2005 | Uchman | |
| 6,969,235 B2 * | 11/2005 | Feest | 384/515 |
| 6,974,259 B2 | 12/2005 | Nomura et al. | |
| 7,070,337 B2 | 7/2006 | Wisotzky | |
| 7,118,182 B2 | 10/2006 | Kayama et al. | |
| 7,241,054 B2 | 7/2007 | Loustanau et al. | |
| 7,244,065 B2 | 7/2007 | Takaki et al. | |
| 7,255,482 B2 | 8/2007 | Yamamoto | |
| 7,287,909 B2 | 10/2007 | Sakamoto | |
| 7,290,939 B2 | 11/2007 | Toda et al. | |
| 7,303,239 B2 | 12/2007 | Loustanau et al. | |
| 7,311,363 B2 | 12/2007 | Suma | |
| 7,338,211 B2 | 3/2008 | Bianco et al. | |
| 7,338,212 B2 | 3/2008 | Sakamoto | |
| 7,374,343 B2 | 5/2008 | Nakajima et al. | |
| 7,380,334 B2 | 6/2008 | Ulmann et al. | |
| 2002/0006240 A1 * | 1/2002 | Sawai et al. | 384/544 |
| 2002/0085781 A1 * | 7/2002 | Ohkuma et al. | 384/544 |
| 2006/0088238 A1 * | 4/2006 | Englander et al. | 384/625 |

FOREIGN PATENT DOCUMENTS

| | | | |
|---|---|---|---|
| GB | EP1319680 | * | 6/1973 |
| JP | 2005147298 A | | 6/2005 |
| JP | 2007271055 A | | 10/2007 |

OTHER PUBLICATIONS

JTEKT Corp, English abstract of JP2007271055.
NTN Toyo Bearing Co. Ltd., English abstract of JP2005147298.

* cited by examiner

WHEEL BEARING ASSEMBLY

FIELD OF THE INVENTION

The present invention relates to wheel bearing assemblies. More particularly, it relates to a wheel bearing assembly having improved side-impact Brinell resistance.

BACKGROUND OF THE INVENTION

As combinations of larger diameter wheels, lower profile tires and more rigid or sensitive corner suspension components are being employed in newer vehicle platforms, the vehicle wheel rotating bearing assembly is much more susceptible to receiving "impact Brinell" damage due to side impacts with objects such as curbs. Impact Brinell marks are microscopic indents in the bearing raceway that occur as a result of impact force loads transmitted from a bearing mating attachment component through the bearing rolling elements. For example, a wheel mounting flange may sustain an impact force and transmit the force load to ball components which impact the bearing raceways of a ball bearing assembly. The typical result of a side-impact Brinell event is the development of a noisy or vibrating bearing assembly in the vehicle.

A typical vehicle curb impact event provides a sudden high peak offset load to the centerline of the wheel bearing assembly. During this type of load the side forces quickly reduce the preload condition of the bearing rolling elements. The axial movement of the rotating component inward toward the non-rotating component then forces some of the balls to move outward radially as they are forced to move inboard along the arcuate profile of the inner ballraces. At the same time, because the load is offset (generated by a curb-height strike to the vehicle wheel) there is also a resultant downward transverse force to the rotating component that causes the largest ballrace impact Brinell depths in the top region of the inboard ballrows and the bottom region of the outboard ballrows, thus generating the noise and/or vibration condition in these regions at the lowest impact state.

A common design solution is to increase the diametral or axial size of the bearing and/or the size or number of rolling elements of the bearing, which usually results in mass/weight and cost penalties and renders the bearing design inefficient in terms of straight running and cornering capabilities. Bearing raceway shoulder heights may also be increased with respect to the ball diameter to provide additional raceway support for the ball during an extreme side force event. This approach, however, raises processing costs. The penalty with all of the traditional ideas is the addition of mass/weight, rotational torque, and costs of the bearing and mating corner components to the bearing.

A need therefore exists for a bearing assembly having improved side-impact Brinell resistance without significant additional mass or reduced efficiency compared to existing bearing assemblies.

BRIEF SUMMARY OF THE INVENTION

In one aspect of the present invention, a bearing assembly is provided comprising a rotating component defining an axis, a non-rotating component fixed with respect to a vehicle suspension structure (e.g., a knuckle or axle), and bearing elements rotatably coupling the rotating component to the non-rotating component to allow the wheel mounting component to rotate relative to the non-rotating component about the axis. The bearing elements include an outer ring and an inner ring defining a first bearing raceway, the first bearing raceway rollably retaining a plurality of rolling elements. To permit load sharing by the vehicle suspension structure in the event of a side impact, either directly or via the non-rotating component, an annular portion of the wheel mounting component is spaced axially from a non-rotating annular surface of either the non-rotating component or the vehicle suspension structure in an outboard direction by a clearance so that a sufficient side impact to the wheel mounting component will cause the wheel mounting component to move into contact with the non-rotating annular surface and transmit a part of a resulting impact load to the vehicle suspension structure. In this way, the rolling elements are spared at least a part of the resulting impact load. To increase the total side impact load sustainable by the bearing assembly without causing a noisy or vibrating operating condition, the assembly is configured so that at least substantially any side impact load sufficient to Brinell damage the first bearing raceway and generate a noise or vibration condition will first cause the wheel mounting component to contact and transmit a load to the vehicle suspension structure through the non-rotating annular surface.

Preferably, the clearance separating the wheel mounting component from the non-rotating annular surface is at most about 0.30 millimeters, and the annular portion of the wheel mounting component is configured to contact the non-rotating annular surface at a generally arcuate contact area having a radial width from about 2 millimeters to about 5 millimeters. When the rolling elements are balls, the first bearing raceways preferably have shoulder heights of between about 30% to about 50% of the diameters of their respective balls.

In one embodiment, the first bearing raceway is an outboard raceway, the plurality of rolling elements retained in the outboard bearing raceway are outboard rolling elements, and the outer ring and inner ring further define an inboard bearing raceway displaced from the outboard raceway in the inboard direction, the inboard raceway rollably retaining a plurality of inboard rolling elements. As is the case for the first bearing raceway, the assembly is configured so that an impact that could generate noise in the second bearing raceway will first impart some of a resulting impact load from the wheel mounting component to the vehicle suspension structure through the non-rotating annular surface.

Several embodiments are possible by varying the relationships of the basic bearing assembly components. For example, the outer ring may be fixed with respect to the suspension structure and the inner ring fixed with respect to the wheel mounting component. Alternatively, the outer ring may be fixed with respect to the wheel mounting component and the inner ring fixed with respect to the suspension structure.

Various rolling elements may be used advantageously in bearing assemblies according to the present invention, permitting still other embodiments. For example, the rolling elements may be balls or tapered rollers, or in the case of a bearing assembly with multiple raceways, balls may be used in one raceway and tapered rollers in another. Any other suitable rolling elements are also within the scope of the present invention, used alone or in combination with one or more other types of rolling elements.

In another aspect of the present invention, a bearing assembly includes a rotating component, a non-rotating component, and ball bearing elements, an annular portion of the wheel mounting component being spaced axially from a non-rotating annular surface of either the non-rotating component or the vehicle suspension structure in an outboard direction by a clearance as in the first aspect. Typically, axial displacement of a wheel mounting component during a side impact causes some of the ball components to roll up on the bearing raceways towards the shoulders of the bearing raceways, which can result in stress concentrations that deepen Brinell indents. In this aspect of the invention, the clearance is controlled to limit this shifting by limiting the axial travel of the wheel mounting component. Preferably, displacement of the ball components along the arcuate profile of the raceways is limited so that the point of contact between the ball components and the bearing raceways is kept at a height on the raceways of about 35% of the ball diameter or lower. A "point of contact" refers to a generally central point in the contact area between the ball components and the raceways, corresponding to a generally central point in a Brinell indent when a Brinell indent is created.

DETAILED DESCRIPTION OF THE INVENTION

Figure 1:
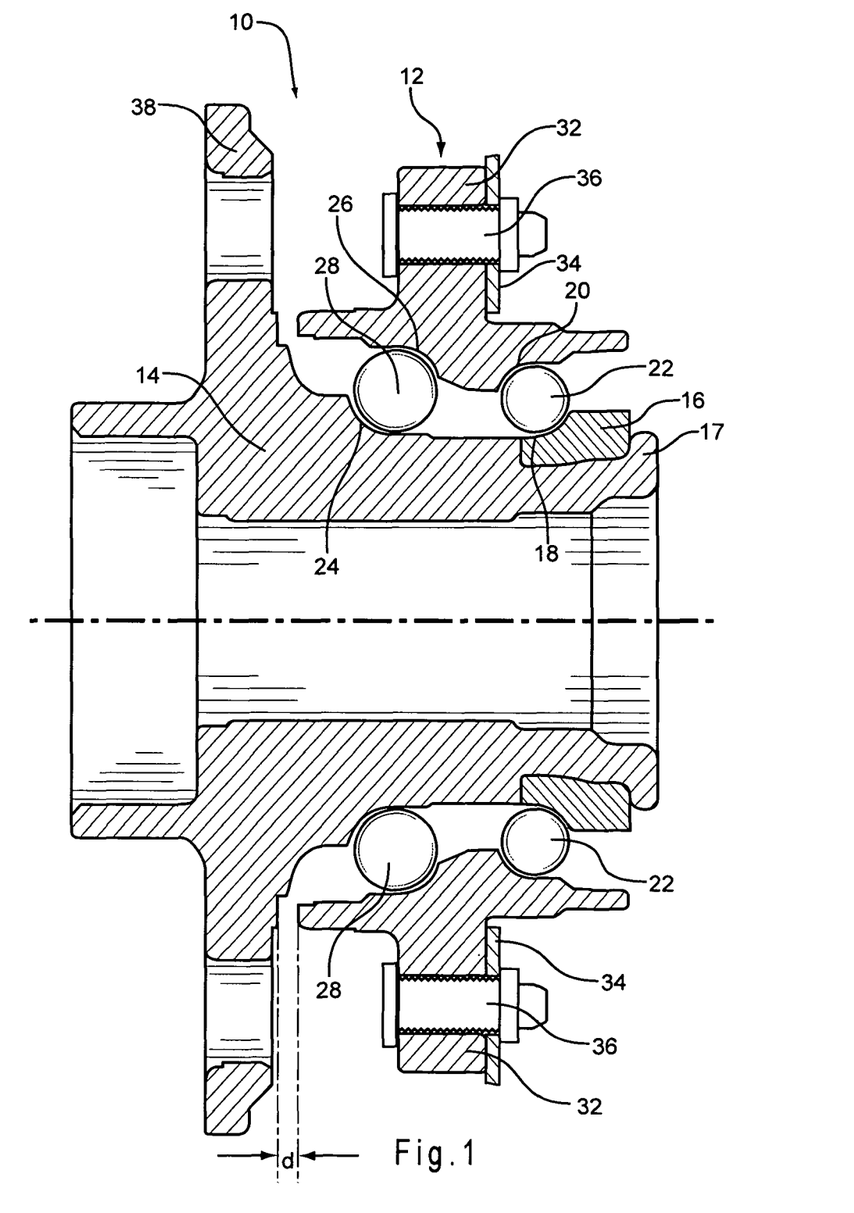
FIG. 1 is a basic illustration of a bearing assembly in side sectional view.
Figure 2:
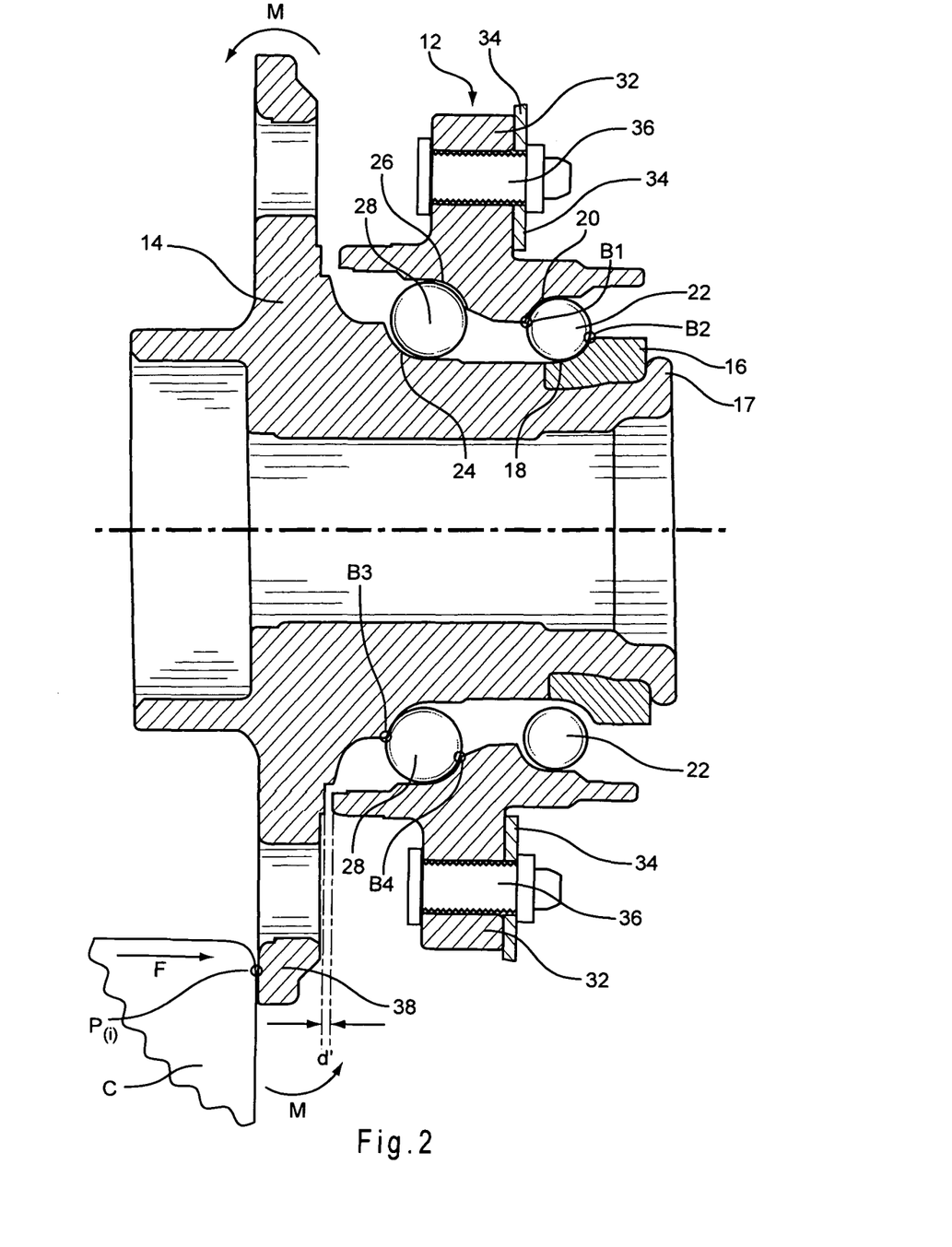
FIG. 2 is an illustration of the effects of a typical curb impact on existing bearing assemblies.

Referring to FIGS. 1 and 2, the problem of impact Brinell damage in existing wheel bearing assemblies is illustrated. Note that FIGS. 1 and 2 are not intended to accurately represent any particular prior art or existing assembly, but rather only to illustrate the problem. In FIG. 1, a representative existing wheel bearing assembly 10 is shown, having a non-rotating outer ring component 12, a rotating inner ring component 14, and an inboard inner bearing ring 16 clamped in place by an integrally formed rotating tab 17. Inboard inner bearing ring 16 defines an inboard inner bearing raceway 18, and non-rotating component 12 defines an inboard outer bearing raceway 20, which together encapsulate an inboard ballrow of ball components 22. Likewise, rotating component 14 defines an outboard inner bearing raceway 24 and non-rotating component 12 defines an outboard outer bearing raceway 26, to accommodate an outboard ballrow of ball components 28. Non-rotating component 12 includes an outer ring mounting flange 32 mounted to vehicle suspension structure 34 by bolts 36.

Turning to FIG. 2, a typical effect of a side impact to rotating component 14 by a curb C is illustrated. As shown, an offset force F to rotating component 14 at an impact point P(i) at a bottom region of a wheel mounting flange 38 causes a moment M which tends to bend or rotate rotating component 14 transversely to its axis in the counterclockwise direction as shown in the figure. Comparing FIG. 1 to FIG. 2, it is shown that an initial distance d separating the bottom region of wheel mounting flange 38 is reduced by the bending and/or rotation to a smaller distance d'. Also as a result of the bending and/or rotation, a preload condition of ball components 22 and 28 is quickly reduced, enabling the axial travel of wheel mounting flange 38 to push some of ball components 22 and 28 out of flush, centered alignment with the ballraces, particularly in the lower region of outboard bearing raceways 24 and 26 and in the upper region of inboard bearing raceways 18 and 20. In particular, with reference to FIG. 2, ball components 28 tend to run up against shoulder points B3 and B4 of bearing raceways 24 and 26, respectively, and ball components 22 tend to run up against shoulder points B1 and B2 of bearing raceways 20 and 18 respectively, resulting in stress concentrations at points B1-B4 that can cause significant impact Brinell damage at those points. A certain degree of impact Brinell damage to any of bearing raceways 18, 20, 24 and 26 will leave indents sufficient to generate an undesirable noise or vibration condition when rotating component 14 rotates relative to non-rotating component 12. Typically, noisy or vibrating bearing operation results from Brinell indents of about 3 microns (0.003 millimeter) in depth, depending upon bearing and/or ball component sizes and vehicle application.

With reference to FIGS. 3-6, a wheel bearing assembly with improved impact Brinell resistance is now described.

Figure 3:
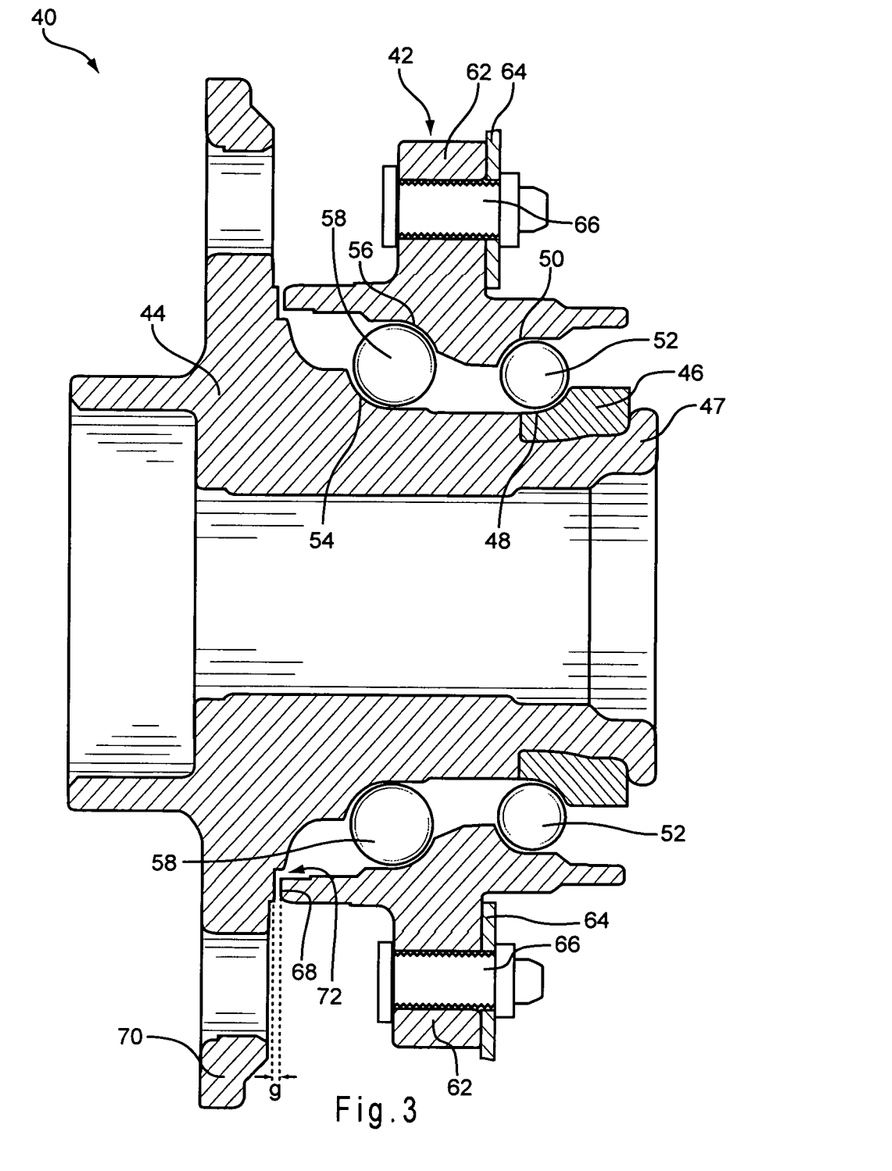
FIG. 3 is a side sectional illustration of a bearing assembly according to the present invention.

Turning to FIG. 3, a wheel bearing assembly 40 is shown which includes a non-rotating outer ring component 42, a rotating inner ring component 44, and an inboard inner bearing ring 46, clamped in place and retained in a fixed position with respect to rotating component 44 by an integrally formed rotating tab 47. It should be noted that the present invention may also advantageously be embodied in non-self-retaining bearing assemblies or bearing assemblies employing other forms of retention, for example, those in which an inboard inner bearing ring is clamped in place by a Rzeppa shaft or stub shaft rather than by a tab integrally formed to a rotating component. Inboard inner bearing ring 46 defines an inboard inner bearing raceway 48, and non-rotating component 42 defines an inboard outer bearing raceway 50, which together encapsulate an inboard ballrow of ball components 52. Likewise, rotating component 44 defines an outboard inner bearing raceway 54 and non-rotating component 42 defines an outboard outer bearing raceway 56, to accommodate an outboard ballrow of ball components 58. Non-rotating component 42 includes a mounting flange 62 for mounting non-rotating component 42 to vehicle suspension structure 64, for example by bolts 66.

Figure 4:
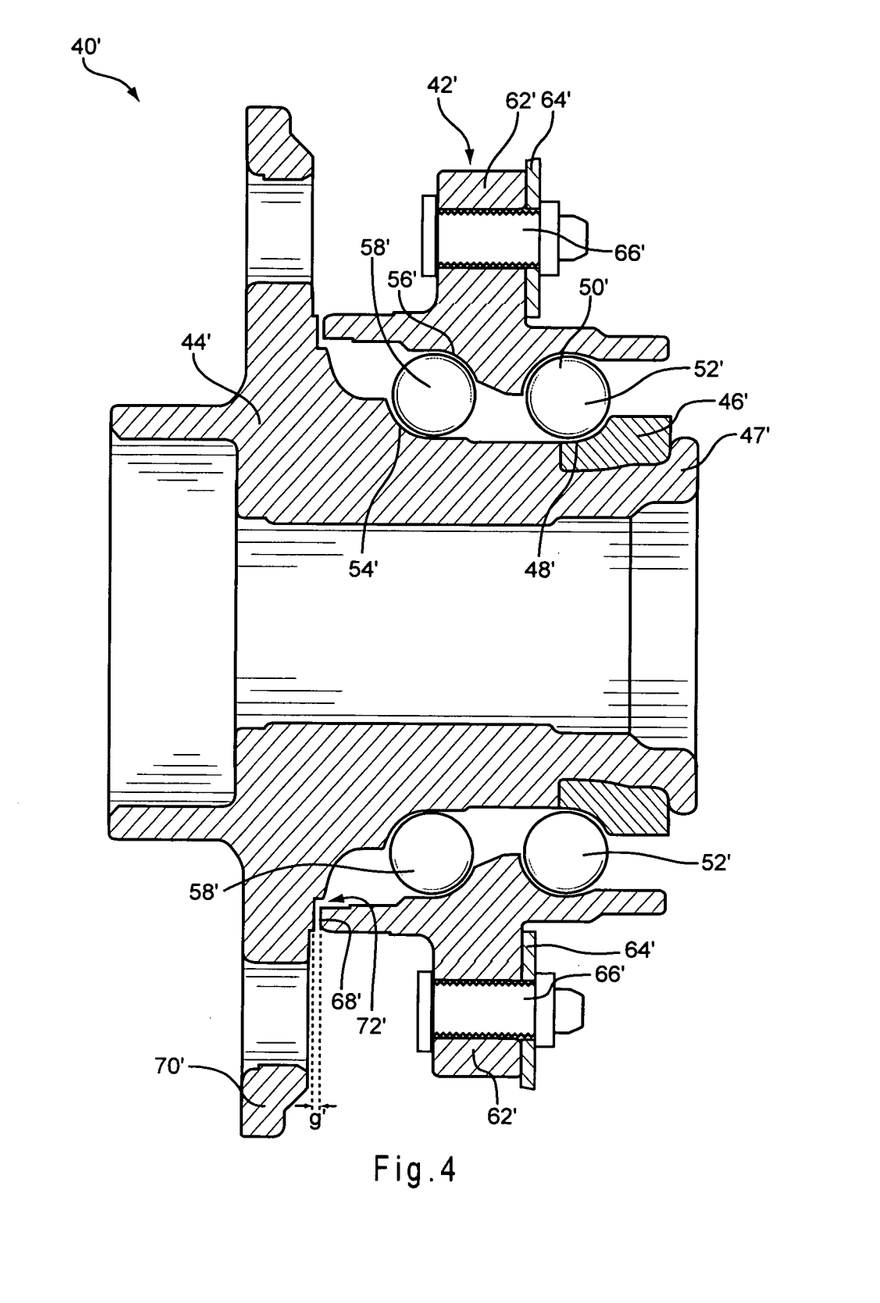
FIG. 4 is a side sectional illustration of another bearing assembly according to the present invention.
Figure 5:
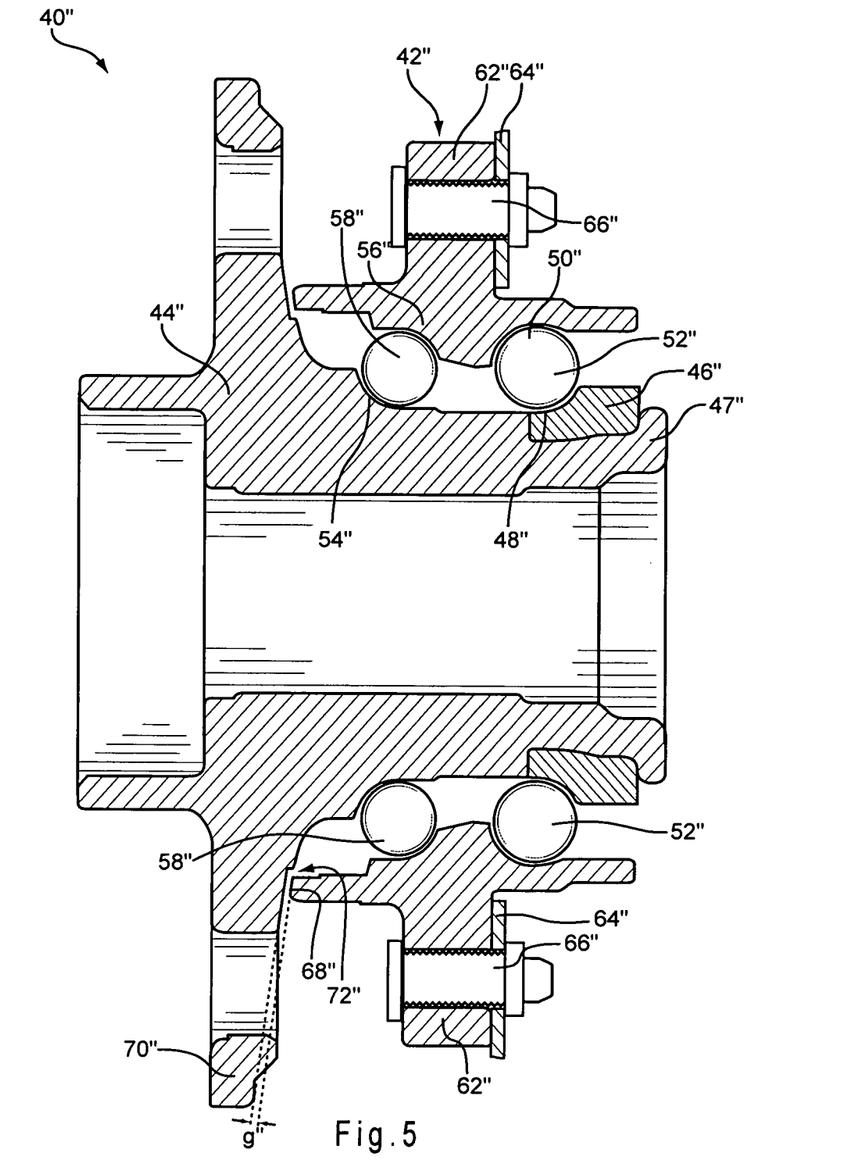
FIG. 5 is a side sectional illustration of still another bearing assembly according to the present invention.
Figure 6:
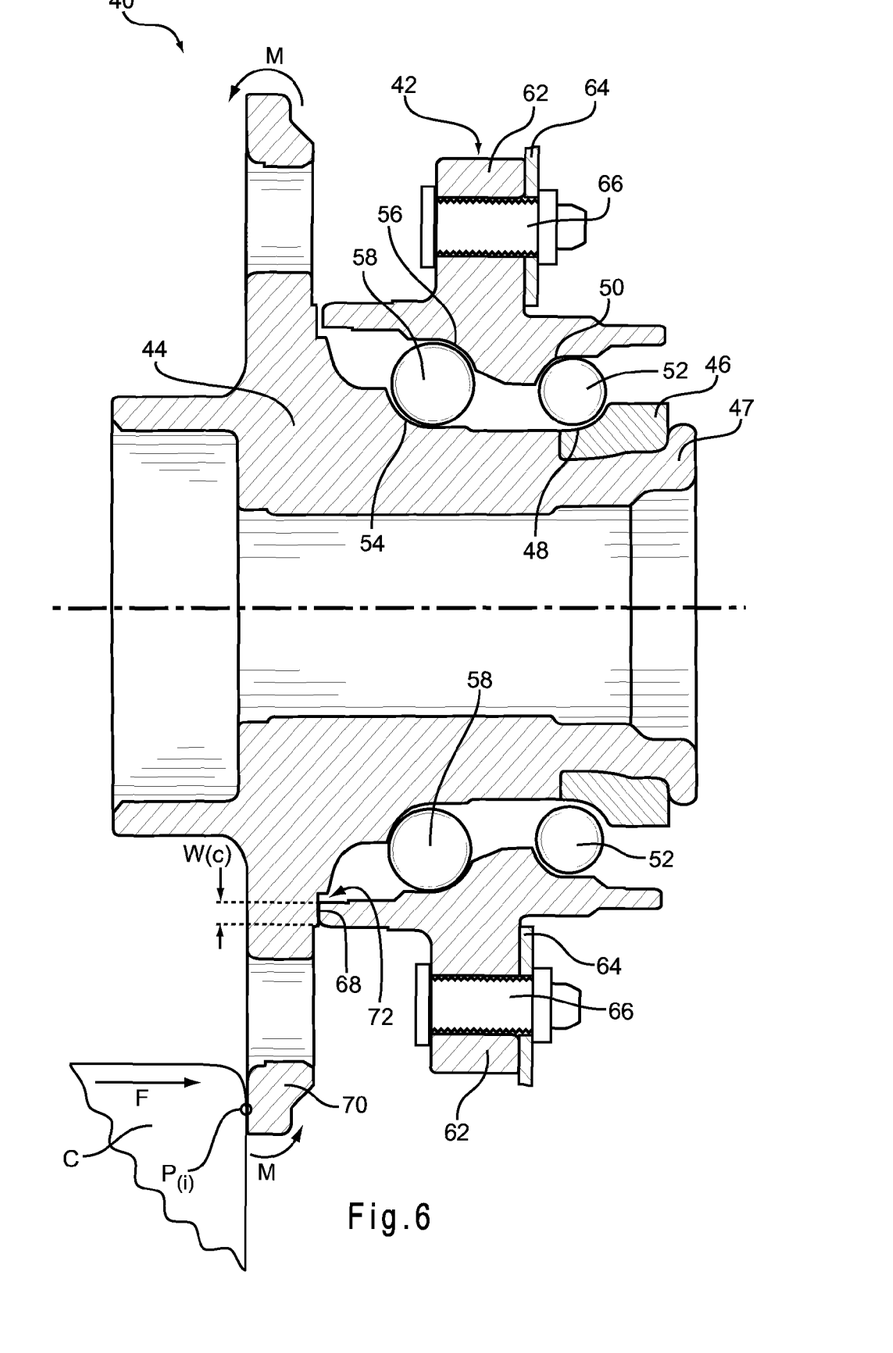
FIG. 6 is a side sectional illustration of a bearing assembly according to the present invention reacting to a typical curb impact.

While wheel bearing assembly 40 includes larger outboard ball components 58 and smaller inboard ball components 52, wheel bearing assembly 40' having ball components 52' and 58' of equal diameter and wheel bearing assembly 40" having an inboard ball component 52" larger than an outboard ball component 58" are also within the scope of the present invention, as shown in FIGS. 4 and 5, respectively.

Additionally, as shown in FIGS. 3-5, an outboard end face 68 of non-rotating component 42 is separated from a wheel mounting flange 70 of rotating component 44 by a controlled gap g. In the event of a sufficient side impact to rotating component 44, such as the impact with curb C illustrated in FIG. 6, wheel mounting flange 70 traverses the distance of controlled gap g and moves into contact with outboard end face 68. Thereafter, any additional load imparted to rotating component 44 is shared by non-rotating component 42, and the relative rigidity of non-rotating component 42 at least substantially prevents further inboard axial travel of wheel mounting flange 70, thus at least substantially preventing further bending or inboard rotation of rotating component 44 and at least substantially preventing a resulting increase in the peak load transmitted through ball components 52 and 58 into bearing raceways 48, 50, 54 and 56. It should be noted that gap g need not be aligned perpendicular to the axis of rotating component 44. As depicted in FIG. 5, non-rotating outboard end face 68″ and the portion of the surface of wheel mounting flange 70″ opposed to end face 68″ are inclined at an angle oblique to the axis, to define a gap g″ inclined at the angle oblique to the axis. Moreover, in other embodiments (not shown), outboard end face 68 need not have a straight-line profile, but may have any profile that is complementary so as to mate with the inboard face of wheel mounting flange 70.

Also, because the axial travel of rotating component 44 towards non-rotating component 42 is limited, so is the shifting of ball components 52 and 58 out of flush alignment with their respective bearing raceways, thus substantially avoiding the stress concentrations high on the shoulders of bearing raceways that tend to result from side impacts to existing bearing assemblies, without the need to increase bearing raceway shoulder heights. For example, the present inventors have found that when the width of controlled gap g was about 0.13 millimeter, the deepest Brinell impact indents resulting from curb impact simulations were located at a radial height on the bearing raceways of only about 30% of the diameter of ball components having a diameter of about 13 millimeters. This is a significant benefit as lower shoulder heights result in lower processing costs and lower wheel bearing assembly torque. With ball components 52 and 58 remaining substantially flush with their respective raceways, the peak load condition is reduced to a total ballrace complement load, and all ball components 52 and 58 of bearing assembly 40 are approximately equally stressed. The result is that wheel bearing assembly 40 can withstand a greater side impact than a similar wheel bearing assembly with a larger gap between its rotating component and non-rotating component, without any of bearing raceways 48, 50, 54 and 56 incurring enough Brinell impact damage to generate a noise condition.

Another significant advantage of controlled gap g is that the close proximity of non-rotating and rotating components 42 and 44 results in a built-in labyrinth 72 which helps to keep debris out of the side of bearing assembly 40 adjacent controlled gap g. This should allow a seal component (not shown) to be made smaller or simpler to reduce frictional torque in bearing assembly 40.

While contact between rotating component 44 and non-rotating component 42 is desirable during an impact event to reduce the load transmitted through ball components 52 and 58, excessive contact between these components during driving can create undesired friction or even itself generate noise and/or vibration. This is particularly a concern with regard to extreme cornering maneuvers that may place enough inboard stress on rotating component 44 to bring it into contact with non-rotating component 42. Therefore, the width of controlled gap g should be optimized to provide improved impact Brinell resistance while nonetheless avoiding excessive contact during driving. Moreover, the width W(c) of the potential contact area between rotating and non-rotating components 44 and 42 is also critical, as a wider contact width W(c) will generate more friction and potentially noise or vibration, whereas a narrower contact width W(c) will result in less load sharing by non-rotating component 42. Hence, the contact width W(c), should also be optimized, for example by controlling the width of non-rotating component outboard end face 68. The optimal parameters can change if certain specs of the assembly are modified, for example, the rotating component flange thickness, rotating component flange design, bearing raceway shoulder heights, and number and diameter of the ball components. The present inventors have found that for a bearing assembly wherein wheel mounting flange 70 has a thickness of about 8-12 mm and bearing raceways 48, 50, 54 and 56 have shoulder heights of about 30-40% of the diameters of their corresponding ball components 52 and 58, a width of controlled gap g of from about 0.04 millimeter to about 0.30 millimeter and a contact width W(c) of from about 2 millimeters to about 5 millimeters provide good impact Brinell resistance and avoid excessive friction, noise or vibration during maneuvers that cause inboard strain on rotating component 44. As bearing raceway shoulder heights of about 45-50% of the ball diameter are common in the industry, good impact Brinell resistance at shoulder heights of about 30-40% of the ball diameter is a surprising benefit achieved by bearing assemblies according to the invention, with significant savings in processing cost and bearing assembly torque.

Figure 7:
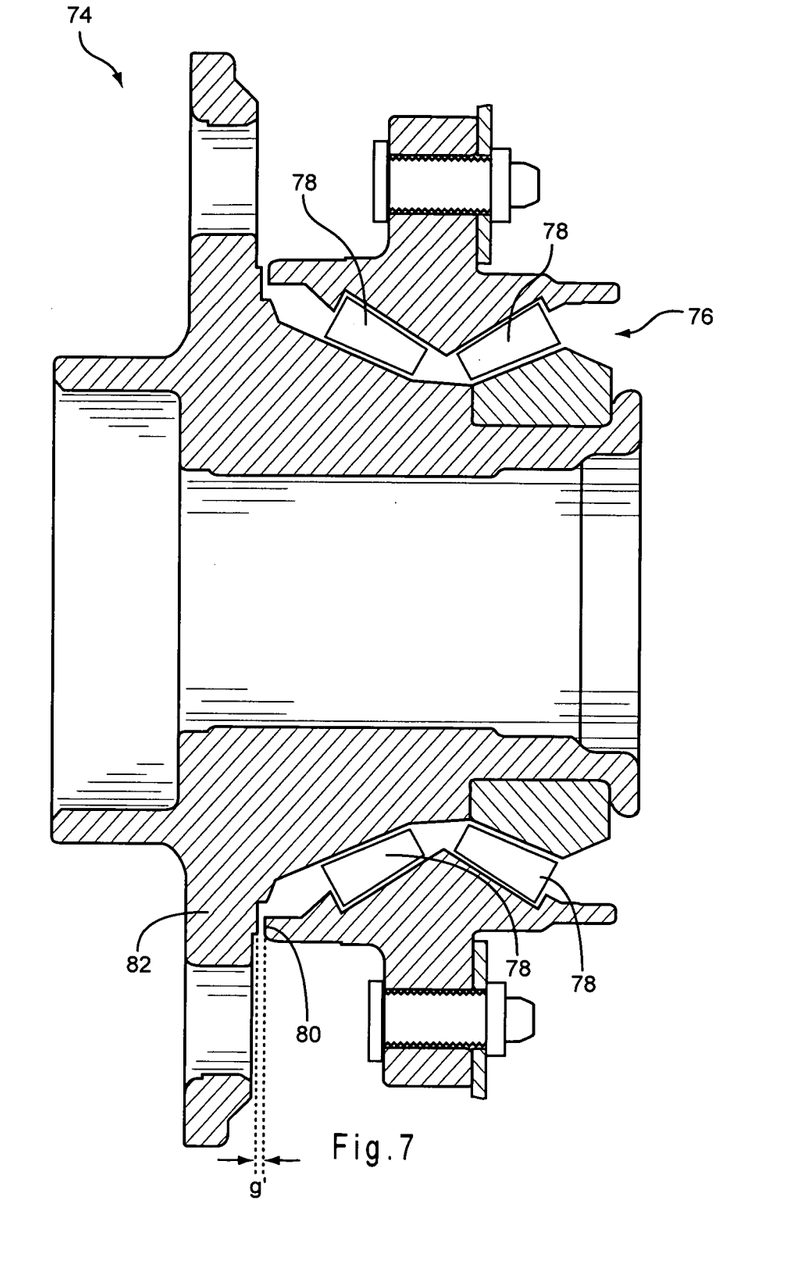
FIG. 7 is a side sectional illustration of a bearing assembly according to the present invention having tapered rollers.

It should be noted that many variations in bearing assemblies are permitted by the present invention. For example, bearing assemblies having rolling elements other than balls, including but not limited to tapered rollers, are within its scope. Turning to FIG. 7, a tapered roller bearing assembly 74 according to the present invention is illustrated. Assembly 74 is essentially similar to assembly 40 except in that it incorporates tapered rollers 78 instead of balls as its rolling elements. The spaced relationship between non-rotating component outboard end face 80 and rotating component flange 82 defining a controlled gap designated g' is similar in structure and function to that described above with reference to FIGS. 3-6. Similarly, other types of rolling elements, or combinations of one type of rolling element in the inboard raceway and another in the outboard raceway, could be substituted for the tapered rollers or balls shown in FIGS. 3-7 without substantially affecting the inventive aspects of a wheel bearing assembly according to the present invention.

Figure 9:
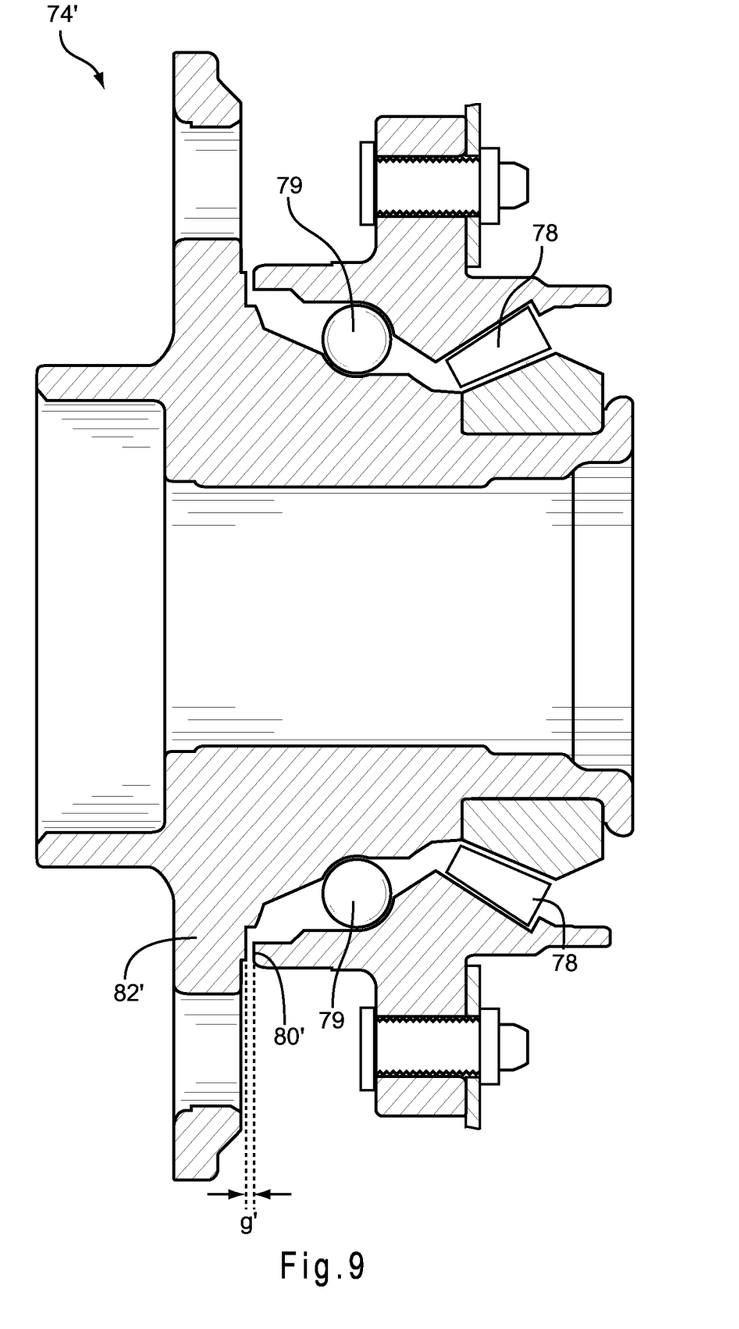
FIG. 9 is a side sectional illustration of a bearing assembly according to the present invention having a combination of balls and tapered rollers.

Other variations are also possible within the present invention. For example, assemblies having bearing rings that are separate from a non-rotating component and a rotating component, assemblies having only a single bearing raceway and ballrow, assemblies having combinations of balls and tapered rollers or other rolling elements, and assemblies in which the rotating component is the outer ring component instead of the inner ring component are also within the scope of the present invention. For instance, depicted in FIG. 9 is an alternative bearing assembly 74' which is similar to tapered roller bearing assembly 74, but having inboard tapered rollers 78 replaced by balls 79, and a non-rotating component outboard end face 80' and rotating component flange 82' defining controlled gap g'. Moreover, although the embodiments illustrated in FIGS. 3-7 closely resemble a "generation III" type of bearing assembly, the present invention can also be advantageously embodied in bearing assemblies having the general configuration of generation 0, I or II bearing assemblies, as long as a wheel-mounting component is permitted to contact and transmit a load to a component fixed with respect to the vehicle suspension structure, or directly to the vehicle suspension structure itself, in the event of a side impact which would ordinarily cause Brinell impact damage sufficient to generate a noise or vibration condition, but which does not cause sufficient damage due to the load sharing by the non-rotating component.

Figure 8:
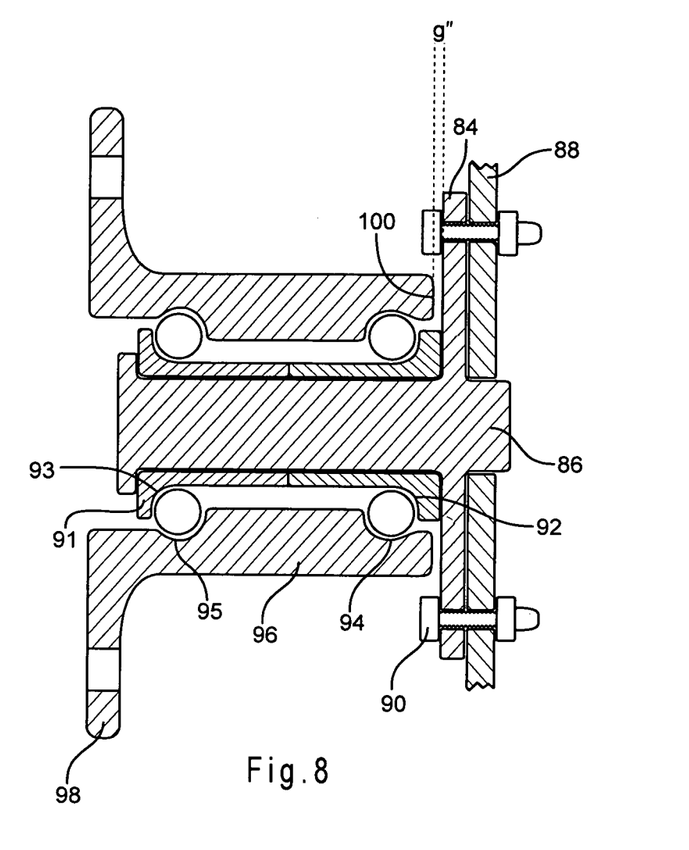
FIG. 8 is a side sectional illustration of a bearing assembly according to the present invention in which an outer ring component is the wheel mounting component.

An example of a bearing assembly according to the present invention more related to a "generation II" assembly, in that the rotating component is the outer ring component, is illustrated in FIG. 8. As shown, a flange 84 of a non-rotating component 86 is mounted to a vehicle suspension structure 88 by bolts 90. A two-piece inner bearing ring 91, defining inner bearing raceways 92 and 93, is clamped fixedly around non-rotating component 86, and outer bearing raceways 94 and 95 are formed in a rotating outer ring component 96 having a wheel mounting flange 98. In this embodiment, a controlled gap g" between an inboard end face 100 of rotating component 96 and non-rotating component flange 84 is optimized to be small enough to limit inboard axial travel of rotating component 96 to substantially prevent noise or vibration generating Brinell damage in the event of an offset side impact to wheel mounting flange 98, yet large enough to avoid excessive contact between rotating component 96 and non-rotating component 86 during extreme driving maneuvers, as discussed above with reference to FIGS. 3-6. It should also be noted that in some assemblies within the scope of the invention, the relevant controlled gap could be between an inboard end face of a rotating component and a part of a vehicle suspension structure itself.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An automotive vehicle wheel bearing assembly comprising
    a wheel mounting component defining an axis;
    a non-rotating component fixed with respect to a vehicle suspension structure; and
    bearing elements rotatably coupling the wheel mounting component to the non-rotating component to allow the wheel mounting component to rotate relative to the non-rotating component about the axis;
    wherein the bearing elements include a first outer raceway and a first inner raceway, the first outer raceway and the first inner raceway rollably retaining a plurality of first rolling elements,
    wherein a portion of the wheel mounting component is spaced axially from a non-rotating surface fixed with respect to the vehicle suspension structure in an outboard direction by an axial clearance of at least about 0.04 mm, but no more than about 0.30 mm, so that a side impact displacing the wheel mounting component in the inboard direction by a distance equal to the axial clearance does not cause an impact indentation from the first rolling elements in the first outer raceway or the first inner raceway deeper than about 3 microns, to avoid a noise or vibration condition when the wheel mounting component rotates relative to the non-rotating component during continued operation of the wheel bearing assembly,
    wherein displacement of the wheel mounting component in the inboard direction by a distance greater than the axial clearance is inhibited by the wheel mounting component contacting and transmitting a load to the vehicle suspension structure through the non-rotating surface, to inhibit deepening of any impact indentation from the first rolling elements in the first outer raceway or the first inner raceway,
    wherein the portion of the wheel mounting component is an annular surface inclined with respect to the wheel mounting component axis, and the non-rotating surface is an annular surface inclined with respect to the wheel mounting component axis, both surfaces being centered on the axis of the wheel mounting component and inclined with respect to the axis at approximately the same oblique angle, and
    wherein the portion of the wheel mounting component is configured to contact the non-rotating surface at a contact area having a radial width of from about 2 millimeters to about 5 millimeters.

2. The vehicle wheel bearing assembly of claim 1, wherein the non-rotating surface is a surface of the non-rotating component.

3. The vehicle wheel bearing assembly of claim 1, wherein the non-rotating surface is a surface of the vehicle suspension structure.

4. The vehicle wheel bearing assembly of claim 1, wherein the first outer raceway and the first inner raceway are outboard raceways, the first rolling elements are outboard rolling elements, and the vehicle wheel bearing assembly further comprises an inboard outer raceway and an inboard inner raceway displaced from the outboard raceway in the inboard direction, the inboard raceways rollably retaining a plurality of inboard rolling elements;
    wherein the axial clearance of the wheel mounting component from the non-rotating surface is sized so that a side impact displacing the wheel mounting component in the inboard direction by a distance equal to the axial clearance does not cause an impact indentation from the inboard rolling elements in the inboard outer raceway or the inboard inner raceway deep enough to result in a noise or vibration condition when the wheel mounting component rotates relative to the non-rotating component during continued operation of the wheel bearing assembly, and
    displacement of the wheel mounting component in the inboard direction by a distance greater than the axial clearance is inhibited by the wheel mounting component contacting and transmitting a load to the vehicle suspension structure through the non-rotating surface, to inhibit deepening of any impact indentation from the inboard rolling elements in the inboard outer raceway or the inboard inner raceway.

5. The vehicle wheel bearing assembly of claim 1, wherein the first outer raceway is fixed with respect to the non-rotating component and the first inner raceway is fixed with respect to the wheel mounting component.

6. The vehicle wheel bearing assembly of claim 1, wherein the first outer raceway is fixed with respect to the wheel mounting component and the first inner raceway is fixed with respect to the non-rotating component.

7. The vehicle wheel bearing assembly of claim 1, wherein the first rolling elements are balls.

8. The vehicle wheel bearing assembly of claim 7, wherein the first outer raceway and the first inner raceway each have a shoulder height of from about 30% to about 40% of the diameter of the balls.

9. The wheel bearing assembly of claim 1, wherein the wheel mounting component comprises a flange having a thickness of about 8-12 mm.

10. An automotive vehicle wheel bearing assembly comprising
    a wheel mounting component defining an axis;
    a non-rotating component fixed with respect to a vehicle suspension structure; and
    bearing elements rotatably coupling the wheel mounting component to the non-rotating component allow the wheel mounting component to rotate relative to the non-rotating component about the axis;
    wherein the bearing elements include an outer raceway and an inner raceway that are at least substantially coaxial with the wheel mounting component, each raceway having an arcuate profile varying in distance from the axis of the wheel mounting component, the outer raceway having a base at a lowest point on its arcuate profile furthest from the axis of the wheel mounting component and a shoulder at a highest point on its arcuate profile closest to the axis of the wheel mounting component, the inner raceway having a base at a lowest point on its arcuate profile closest to the axis of the wheel mounting component and a shoulder at a highest point on its arcuate profile furthest from the axis of the wheel mounting component, the outer raceway and the inner raceway rollably retaining a plurality of balls, wherein the wheel mounting component is operatively engaged to the balls so that inboard displacement of the wheel mounting component causes a point of contact between at least one of the balls and at least one of the outer raceway and the inner raceway to be displaced higher along the arcuate profile of the at least one of the outer raceway, and the inner raceway, wherein a non-rotating surface fixed with respect to the vehicle suspension structure is spaced in an inboard direction from a portion of the wheel mounting component by an axial clearance, to permit a side impact to the wheel mounting component in the inboard direction to cause the portion of the wheel mounting component to move into contact with the non-rotating surface, wherein the axial clearance is no less than about 0.04 mm and no greater t about 0.30 mm and sized so that displacing the wheel mounting component in the inboard direction by a distance equal to the axial clearance results in a maximum displacement of said point of ball-and-raceway contact to a height above the base of the arcuate profile of either the outer raceway or the inner raceway no greater than about 35% of the diameter of the balls, wherein the non-rotating surface is configured to contact the wheel mounting component to inhibit inboard displacement of the wheel mounting component by a distance greater than the axial clearance, to prevent the outer raceway or the inner raceway from incurring greatest impact indentation depths at a height above the base of its arcuate profile greater than about 35% of the diameter of the balls, wherein the portion of the wheel mounting component is an annular surface inclined with respect to the wheel mounting component axis, and the non-rotating surface is an annular surface inclined with respect to the wheel mounting component axis, both surfaces being centered on the axis of the wheel mounting component and inclined with respect to the axis at approximately the same oblique angle, wherein the portion of the wheel mounting component is configured to contact the non-rotating surface at a contact area having a radial width of from about 2 millimeters to about 5 millimeters, and wherein the first outer raceway and the first inner raceway each have a shoulder height of from about 30% to about 40% of the diameter of the balls.

11. The wheel bearing assembly of claim 10, wherein the wheel mounting component comprises a flange having a thickness of about 8-12 mm.

* * * * *